United States Patent
Bai et al.

(10) Patent No.: US 7,531,264 B2
(45) Date of Patent: May 12, 2009

(54) FUEL CELL STACK WITH EVEN DISTRIBUTING GAS MANIFOLDS

(75) Inventors: Dingrong Bai, Dorval (CA); Jean-Guy Chouinard, Ville St-Laurent (CA); David Elkaïm, Ville St-Laurent (CA)

(73) Assignee: Hyteon Inc., Laval, Québec (CA)

( * ) Notice: Subject to any disclaimer, the term of this patent is extended or adjusted under 35 U.S.C. 154(b) by 375 days.

(21) Appl. No.: 10/861,416

(22) Filed: Jun. 7, 2004

(65) Prior Publication Data

US 2005/0271910 A1    Dec. 8, 2005

(51) Int. Cl.
*H01M 8/02* (2006.01)
*H01M 8/04* (2006.01)

(52) U.S. Cl. .............................. 429/34; 429/35; 429/38; 429/39; 429/13

(58) Field of Classification Search .................... 429/34, 429/35, 36, 37, 38, 39
See application file for complete search history.

(56) References Cited

U.S. PATENT DOCUMENTS

| | | | |
|---|---|---|---|
| 3,881,956 A | 5/1975 | Williams et al. | |
| 4,310,605 A | 1/1982 | Early et al. | |
| 4,732,822 A | 3/1988 | Wright et al. | |
| 4,769,297 A | 9/1988 | Reiser et al. | |
| 4,826,742 A | 5/1989 | Reiser | |
| 4,933,242 A | 6/1990 | Koga et al. | |
| 4,988,583 A | 1/1991 | Watkins et al. | |
| 5,108,849 A | 4/1992 | Watkins et al. | |
| 5,300,370 A | 4/1994 | Washington et al. | |
| 5,382,478 A | 1/1995 | Chow et al. | |
| 5,478,662 A | 12/1995 | Strasser | |
| 5,521,018 A | 5/1996 | Wilkinson et al. | |
| 5,527,363 A | 6/1996 | Wilkinson et al. | |
| 5,547,777 A | 8/1996 | Richards | |

(Continued)

FOREIGN PATENT DOCUMENTS

EP    0967 675    12/1999

(Continued)

OTHER PUBLICATIONS

Koh et al. Pressure and flow distribution in internal gas manifolds Journal of Power Sources vol. 115, pp. 54-65 2003.

(Continued)

*Primary Examiner*—Jonathan Crepeau
*Assistant Examiner*—Tony Chuo
(74) *Attorney, Agent, or Firm*—Ogilvy Renault LLP (57) ABSTRACT

A method of controlling fluid flow to a stack of fuel cell flow field plates comprises providing in each fuel cell flow field plate of the stack of plates a fluid supply manifold aperture for conducting a supply of fluid to a number of the plates in the stack, the fluid supply manifold apertures forming an elongated fluid supply manifold extending through the stack, flowing the supply of fluid into the fluid supply manifold and laterally diverting a part of the supply of fluid to feed each of the number of the plates. The plates are each fed in parallel from the fluid supply manifold, and the laterally diverting is performed in a manner to avoid turbulence in the fluid supply manifold from adversely affecting supply of fluid to downstream ones of the number of plates.

10 Claims, 10 Drawing Sheets

U.S. PATENT DOCUMENTS

| | | |
|---|---|---|
| 5,686,199 A | 11/1997 | Cavalca et al. |
| 5,840,438 A | 11/1998 | Johnson |
| RE36,148 E | 3/1999 | Strasser |
| 5,945,232 A | 8/1999 | Ernst et al. |
| 6,017,648 A | 1/2000 | Jones |
| 6,037,072 A | 3/2000 | Wilson et al. |
| 6,048,633 A | 4/2000 | Fujii et al. |
| 6,066,409 A | 5/2000 | Ronne et al. |
| 6,099,984 A | 8/2000 | Rock |
| 6,124,051 A | 9/2000 | Johnson |
| 6,150,049 A | 11/2000 | Nelson |
| 6,180,273 B1 | 1/2001 | Okamoto et al. |
| 6,207,310 B1 | 3/2001 | Wilson et al. |
| 6,309,773 B1 | 10/2001 | Rock |
| 6,403,249 B1 | 6/2002 | Reid |
| 6,416,895 B1 | 7/2002 | Voss et al. |
| 6,500,579 B1 | 12/2002 | Maeda et al. |
| 6,528,196 B1 | 3/2003 | Fujii et al. |
| 6,602,625 B1 | 8/2003 | Chen et al. |
| 6,605,378 B2 | 8/2003 | Saito et al. |
| 6,607,858 B2 | 8/2003 | Wozniczka et al. |
| 6,649,293 B1 | 11/2003 | Jones |
| 6,684,948 B1 | 2/2004 | Savage et al. |
| 6,686,080 B2 | 2/2004 | Farkash et al. |
| 6,686,082 B2 | 2/2004 | Leger et al. |
| 6,692,859 B2 | 2/2004 | Mukerjee et al. |
| 2001/0001052 A1 | 5/2001 | Bonk et al. |
| 2001/0021470 A1 | 9/2001 | May et al. |
| 2001/0049046 A1 | 12/2001 | Butler |
| 2002/0045075 A1 | 4/2002 | Pinto et al. |
| 2002/0081474 A1 | 6/2002 | Foster |
| 2002/0106548 A1 | 8/2002 | Chung et al. |
| 2002/0110723 A1 | 8/2002 | Farkash |
| 2002/0168560 A1 | 11/2002 | Mukerjee et al. |
| 2002/0187374 A1 | 12/2002 | Yamauchi et al. |
| 2002/0192531 A1 | 12/2002 | Zimmerman et al. |
| 2003/0003345 A1 | 1/2003 | Ohara et al. |
| 2003/0039876 A1 | 2/2003 | Knights et al. |
| 2003/0059662 A1 | 3/2003 | Debe et al. |
| 2003/0072986 A1 | 4/2003 | Kusakabe et al. |
| 2003/0099873 A1 | 5/2003 | Brambilla et al. |
| 2003/0104265 A1 | 6/2003 | Yoshimoto et al. |
| 2003/0118878 A1 | 6/2003 | Pinto |
| 2003/0138688 A1 | 7/2003 | Hattori et al. |
| 2003/0148157 A1 | 8/2003 | Grasso et al. |
| 2003/0152819 A1 | 8/2003 | Hatoh et al. |
| 2003/0170526 A1 | 9/2003 | Hodgson et al. |
| 2003/0180603 A1 | 9/2003 | Richards |
| 2003/0186106 A1 | 10/2003 | Frank et al. |
| 2003/0198839 A1 | 10/2003 | Bruck et al. |
| 2003/0211376 A1 | 11/2003 | Hatoh et al. |
| 2003/0219635 A1 | 11/2003 | Lee et al. |
| 2003/0219643 A1 | 11/2003 | Yang et al. |
| 2004/0018412 A1 | 1/2004 | Orsbon et al. |
| 2004/0023100 A1 | 2/2004 | Boff et al. |
| 2004/0110057 A1 * | 6/2004 | Yoshimoto et al. ............ 429/38 |
| 2005/0042498 A1 | 2/2005 | Whiton et al. |
| 2005/0129999 A1 * | 6/2005 | Geschwindt et al. .......... 429/22 |

FOREIGN PATENT DOCUMENTS

| | | |
|---|---|---|
| EP | 0967 675 A2 | 12/1999 |
| EP | 1147568 | 3/2003 |
| EP | 1286408 | 12/2004 |
| JP | 6267564 | 9/1994 |
| JP | 7-22048 | 1/1995 |
| JP | 2001-148252 * | 5/2001 |
| WO | WO 01/48843 A2 | 7/2001 |
| WO | WO 02/069426 A2 | 9/2002 |
| WO | WO 02/093668 A1 | 11/2002 |
| WO | WO 02/093672 A2 | 11/2002 |
| WO | WO 03/026049 A3 | 3/2003 |
| WO | WO2004/070859 A1 | 8/2004 |

OTHER PUBLICATIONS

U.S. Appl. No. 10/861,416, filed Jun. 7, 2004, Bai et al.
U.S. Appl. No. 10/861,409, filed Jun. 7, 2004, Bai et al.
Hirata et al. Journal of Power Sources vol. 83, pp. 41-49 1999.
Wang et al. Journal of Power Sources vol. 94, pp. 40-50 2001.
Neshai et al http:www.utc.scsu.edu/effects.htm last visited Aug. 5, 2003.
Lie et al. Journal of Power Sources, vol. 115, pp. 90-100 2003.
Yong et al. Journal of Power Sources vol. 118, pp. 193-199 2003.

* cited by examiner

FUEL CELL STACK WITH EVEN DISTRIBUTING GAS MANIFOLDS

CROSS-REFERENCE TO RELATED APPLICATIONS

The application is related to commonly assigned co-pending U.S. patent application Ser. No. 10/861,409 titled "Flow Field Plate for Use in Fuel Cells", filed simultaneously herewith, the content of which is hereby incorporated by reference.

STATEMENT REGARDING US GOVERNMENT SPONSORED RESEARCH OR DEVELOPMENT

Not Applicable.

FIELD OF THE INVENTION

The invention relates to a gas separator for use in a fuel cell. More specifically, it relates to a method and apparatus for controlling the distribution of reaction gases into unit cells in a fuel cell stack.

BACKGROUND OF THE INVENTION

Fuel cells are electrochemical devices that convert chemical energy from a fuel directly into electrical energy with high efficiency. Generally, a single Proton Exchange Membrane (PEM) fuel cell employs a membrane electrode assembly (MEA) that comprises an ion exchange membrane or solid polymer electrolyte disposed between two electrically conductive separator or flow field plates. The flow field plates act as current collectors, and generally have flow passages formed therein for directing the fuel and the oxidant to the respective electrodes, namely, the anode on the fuel side and the cathode on the oxidant side. In order to produce enough power for a practical application, an assembly of two or more fuel cells can be connected together, generally in series, but sometimes in parallel. Such a series-connected multiple fuel cell arrangement is referred to as a fuel cell stack, and is usually held together in its assembly state by tie rods and end plates. The stack typically includes manifolds and ports for respectively directing a fuel stream, an oxidant stream and a coolant stream to, and from the flow fields.

A manifold is the conduit of an appliance that supplies gas to, or receives gas from, the individual cell in a stack. The manifolds of a fuel cell stack can be either external or internal, with majority being the latter. External manifolds are simpler and less costly to manufacture than internal manifolds, but have major drawbacks, such as gas leakage and sealing problems. An internal manifold is oftentimes more advantageous not only because of better sealing conditions, but also because the stack is not sensitive to a change in stack height due to shrinking. Such an internal manifold is a system with a self-contained reactant delivery system similar to a boxed fuel cell system that would only require connections to the reactant tanks to become operational. An internal manifold is typically formed by a series of manifold holes on each plate, which when aligned, form a conduit that is used to transport and distribute the reaction gas into the individual cell in the stack.

The fluid manifold design plays a significant role in determining fuel cell performance. A design requirement is that the manifold should provide even distribution of the reactants (e.g. air or reformate) and coolant to each cell in the stack. However, current designs, regardless of whether their shape is rounded-rectangular or irregular, have been found to provide too low of a flow to a certain number of the cells near the manifold inlet or outlet or at both ends, which results in cell starvation and poor water management. In addition, non-uniform distribution encourages use of large reactant supply rates (large stoichiometry) thus resulting in low reactant utilization and large parasitic power consumption.

The geometric design factors of an internal manifold include manifold structure, size, gas flow pattern and the fittings and junction structure between the manifold and the external piping. Koh et al. ("Pressure and flow distribution in internal gas manifolds of a fuel-cell stack," Journal of Power Sources, 115, pp. 54-65, 2003) describes simulated pressure and flow distributions in a 100-cell molten carbonate fuel cell (MCFC) stack having either reverse (U shape) or parallel (Z shape) flow configurations. They found that when the geometry of the manifold flow junction of the fuel cell stack is modeled as a fully open gate valve or sudden contraction with a moderate geometric loss of coefficient of 0.2, non-uniform flow distribution is observed in either a reverse flow or a parallel flow. The non-uniformity is more significant at the cathode side where the gas utilization is generally small, than at the anode where the gas utilization is sufficiently high to allow a relatively low gas flow rate. The difference of the mass flow rate from the average value can be up to ±30 to 60% for the cells at the ends of the stack depending on the geometric resistance.

The prior art contains examples of manifold designs proposed as a solution to the non-uniform distribution of reaction gas in fuel cell stack. For example, European Patent Application No. EP 0 967 675 A2 issued to Mizuno Seiji published on Dec. 29, 1999 disclosed a gas manifold for distributing gas in a fuel cell, in which at least one gas transit manifold is provided that extends in the unit cell-stacking direction to intersect with the gas passages of each of the unit cells, interconnecting the gas passages of the unit cells between an inlet manifold and a discharging manifold. Multiple transit manifolds can be provided according to this method. It is claimed that since the gas flows via the transit manifold when flowing through each in-cell gas passage, the gas flow rates in the in-cell gas passages of the entire fuel cell can be substantially equalized. Also because the in-cell gas passages communicate with one another via the transit manifold and the flows of the gas from the in-cell passages merge in the transit manifold, the gas flow rates become substantially equalized in the transit manifold even if the gas flow rates in the in-cell gas passages upstream of the transit manifold significantly vary. Unfortunately, the addition of the transit manifolds would, however, increase the requirement for sealing, and create extra pressure losses. In addition, the disclosed method does not provide a uniform flow to the upstream flow passages of the first transit manifold, which would pose a serious problem because the upstream part, where the electrochemical reactions generally undergo vigorously, will have a significant impact on the cell performance.

U.S. Patent Application Publication No. 2003/0104265 A1 issued to Yasunori Yoshimoto et al. on Jun. 5, 2003 disclosed a gas manifold design for fuel cells, in which a cylindrical/tubular piercing member is provided in at least one inner manifold with a proper gap between the piercing number and an inner wall of the inner manifold. The reformed gas supplied to the inner manifold is flow-regulated by the piercing member before being uniformly distributed to each cell. In practice, the piercing number can be combined with the tie rods. The position of the piercing is, however, difficult to maintain accurately during stack assembly and throughout the lifetime of the fuel cell. Furthermore, it is hard to achieve a developed flow after the gas passing the piercing, which in general would have caused more turbulence and even wake flow that certainly will result in non-uniform flow distributions into the cells and into the channels communicating with the manifold.

Figure 1:
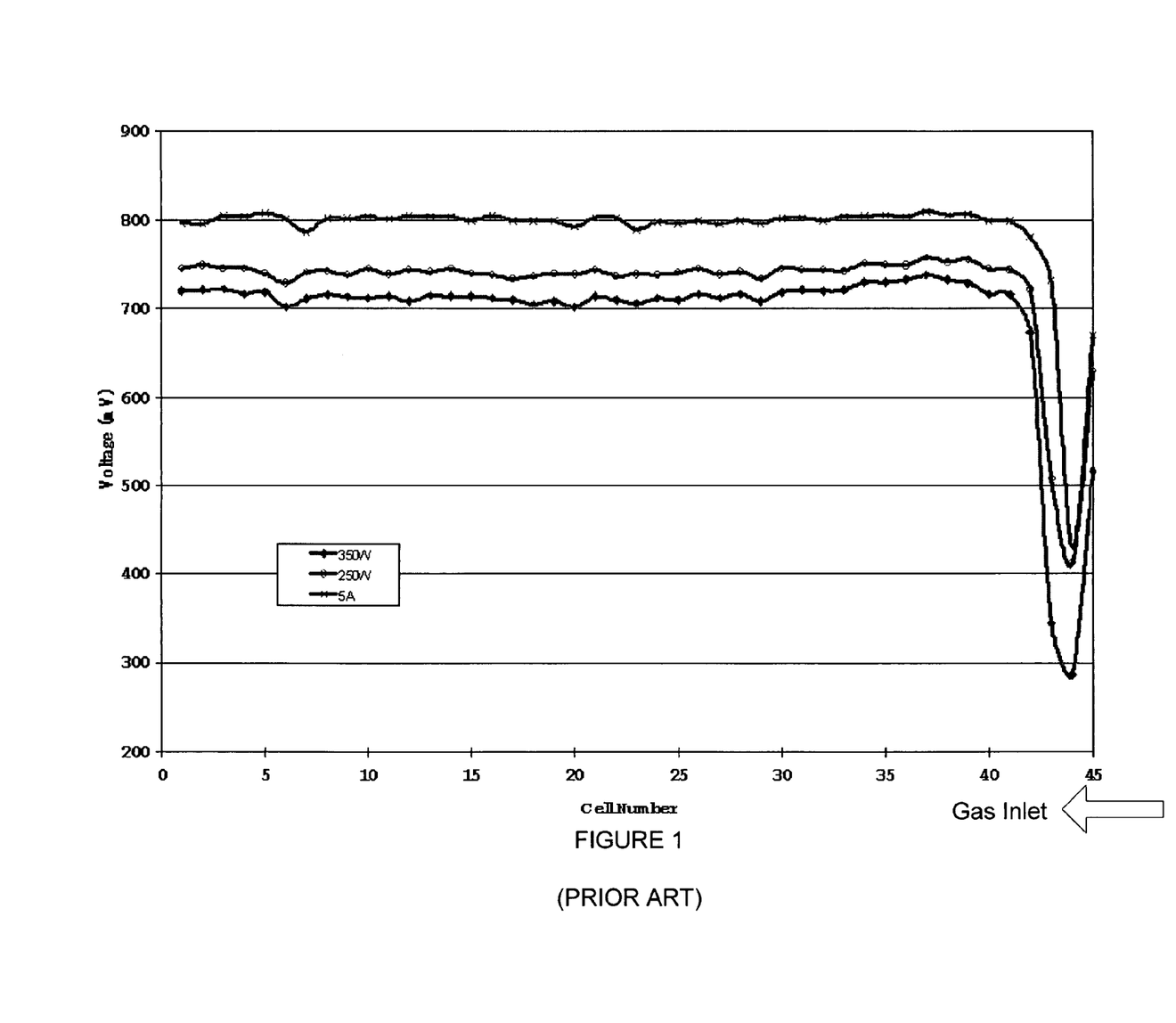
FIG. 1 is a graph of the measured cell voltage corresponding to each cell in a fuel cell stack designed according to prior art methods.

It has been observed that the fuel cell stack exhibits non-uniformity in terms of cell voltage profile. Data collected from a unit producing 500 Watts having 45 cells showed a clear drop in cell voltage for the first few cells near the manifold entrance. With respect to FIG. 1, showing a graph of the measured cell voltage corresponding to each cell in a fuel cell stack designed according to prior art methods, cell voltage is fairly constant for most of the cells (cell #1 to #41), but it drops dramatically from cell #42, reaching a minimum at cell #44 where the cell voltage is only 50-60% of the average for the cells #1 to #41.

The non-uniform profile in the cell voltage could be attributed to a number of factors, one of them being the non-uniform distribution of gas flow. Due to the nature of flow distribution resulting from the stack geometric constraints, less gas is thought to be flowing through the cells where lower cell voltage is observed. As a result of this low gas flow, water droplets cannot be carried out the flow channels, which in turn reduces the gas flow due to increased resistance. In practical operation, one needs to operate the stack at much higher gas flow rate (i.e. high stoichiometry) to minimize the effect of non-uniform gas flow distribution. However, higher stoichiometry is thought to be a barrier for achieving higher system efficiency.

Figure 2:
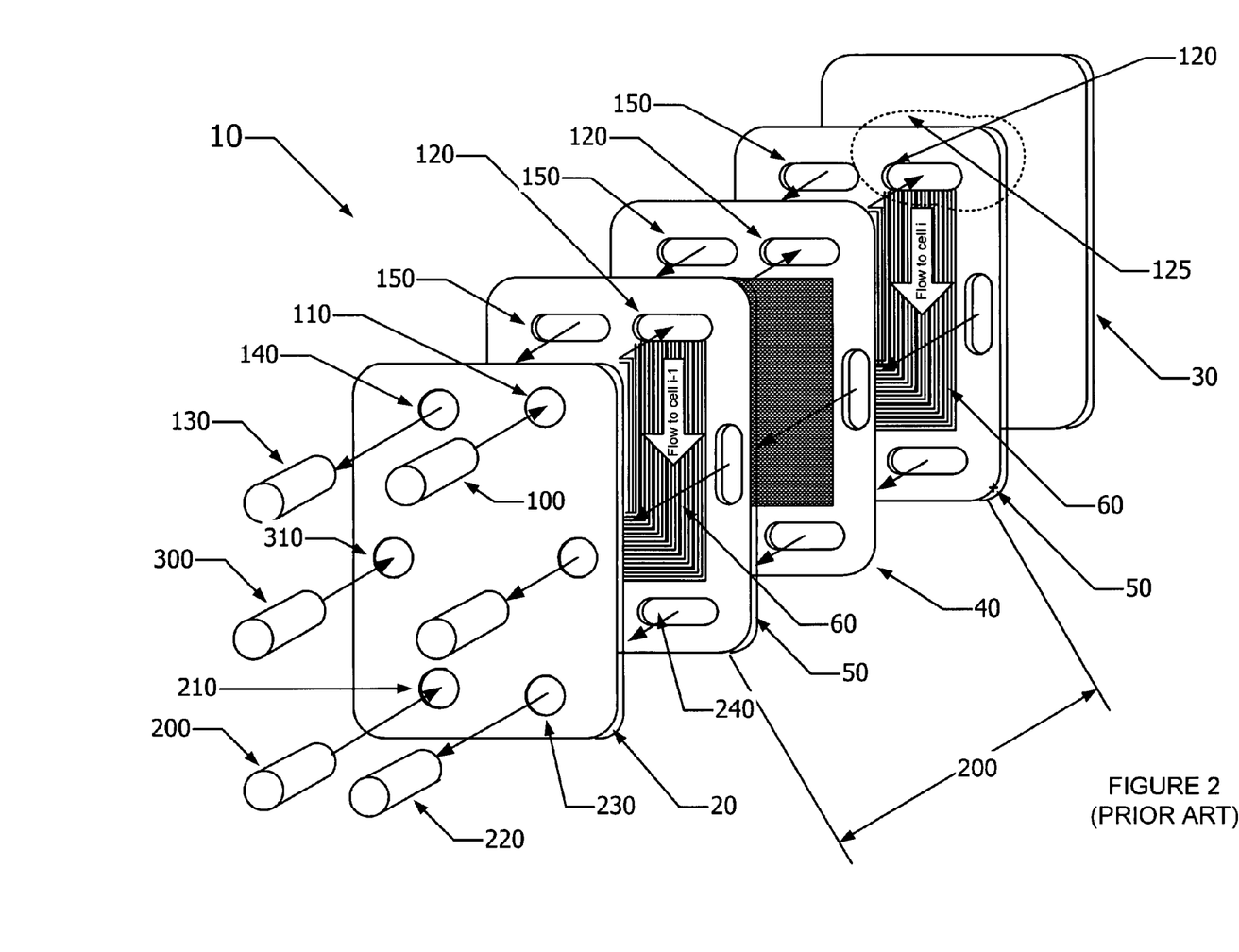
FIG. 2 is an exploded perspective view of a prior art fuel cell stack.

The structure of the gas manifolds has a significant impact upon the flow distribution in the stack. FIG. 2 schematically illustrates a fuel cell stack 10, which is typical of the conventional designs in the field. It should be understood that for purposes of illustration the reverse flows are arranged for the streams of fuel 100, oxidant 200 and coolant 300. As it is well known in the field, a conventional fuel cell stack comprises two end plates 20 and 30, and sandwiched between multiple cells 200 having an anode plate, a cathode plate and a membrane electrode assembly (MEA) 50 and a gasket 40. On each plate, there are holes 120 to form fuel supply manifold, holes 150 to form fuel exhaust manifold. Similarly, there are holes to form manifolds for supplying the oxidant and coolant, for exhausting the oxidant and coolant. The description will be done with respect to the fuel stream and it should be understood that the discussion is also applicable to the streams of oxidant and coolant.

Figure 3:
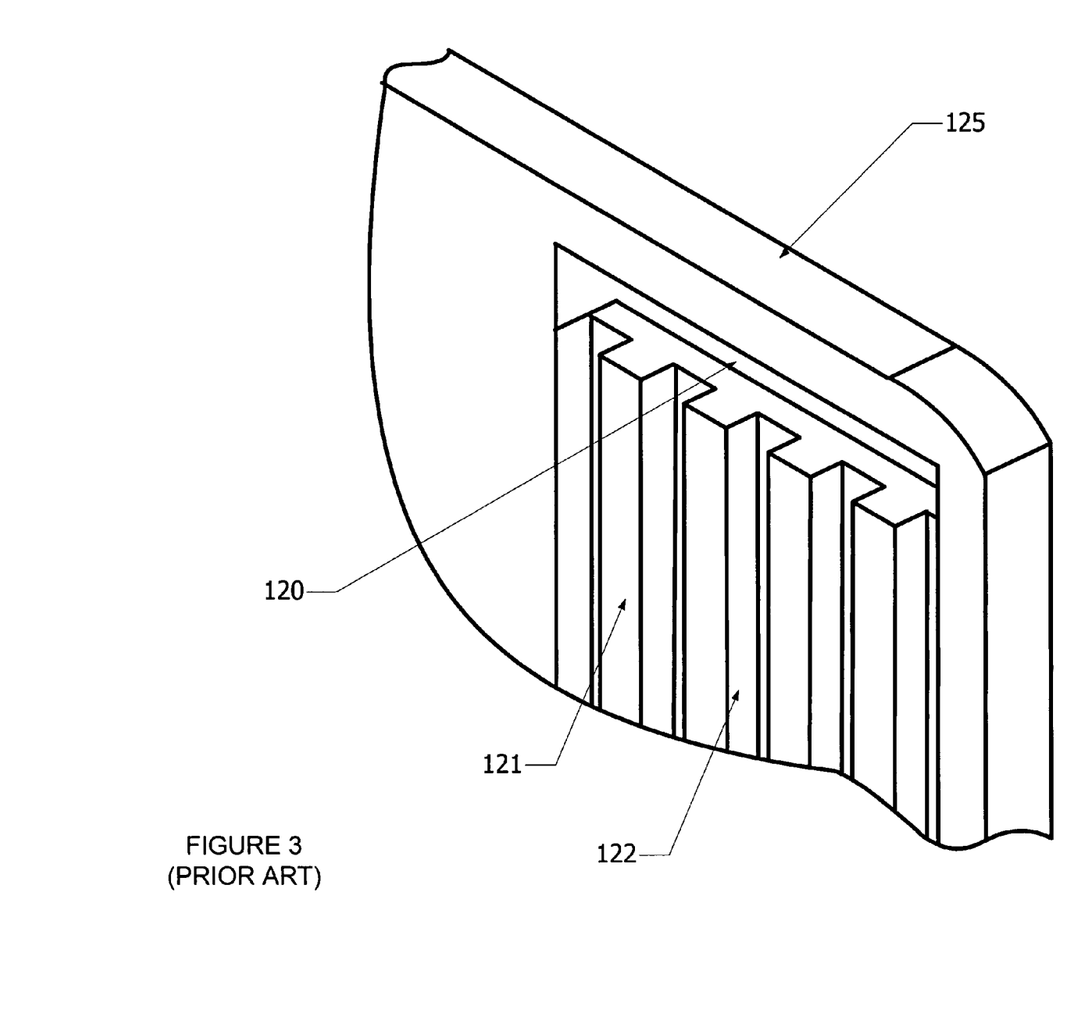
FIG. 3 is an enlarged view of the prior art manifold structure from FIG. 2.

Referring to FIG. 2, the fuel line 100, which is generally a circular pipe, is connected to the stack fuel entrance via a fitting and like (not shown) on the end plate 20. The hole 110 on the end plate 20 generally has a different shape and size than the holes 120 on the separator plates. A detailed structure of the manifold 125 is shown in FIG. 3. As the fuel enters into the fuel supply manifold formed by the holes 120, a portion of the flow will enter into the gas flow channels 122 separated by a land 121. It is common that there is only one hole on the plate introducing gas into the gas passage and only one hole for discharging gas from the passages.

Figure 4A:
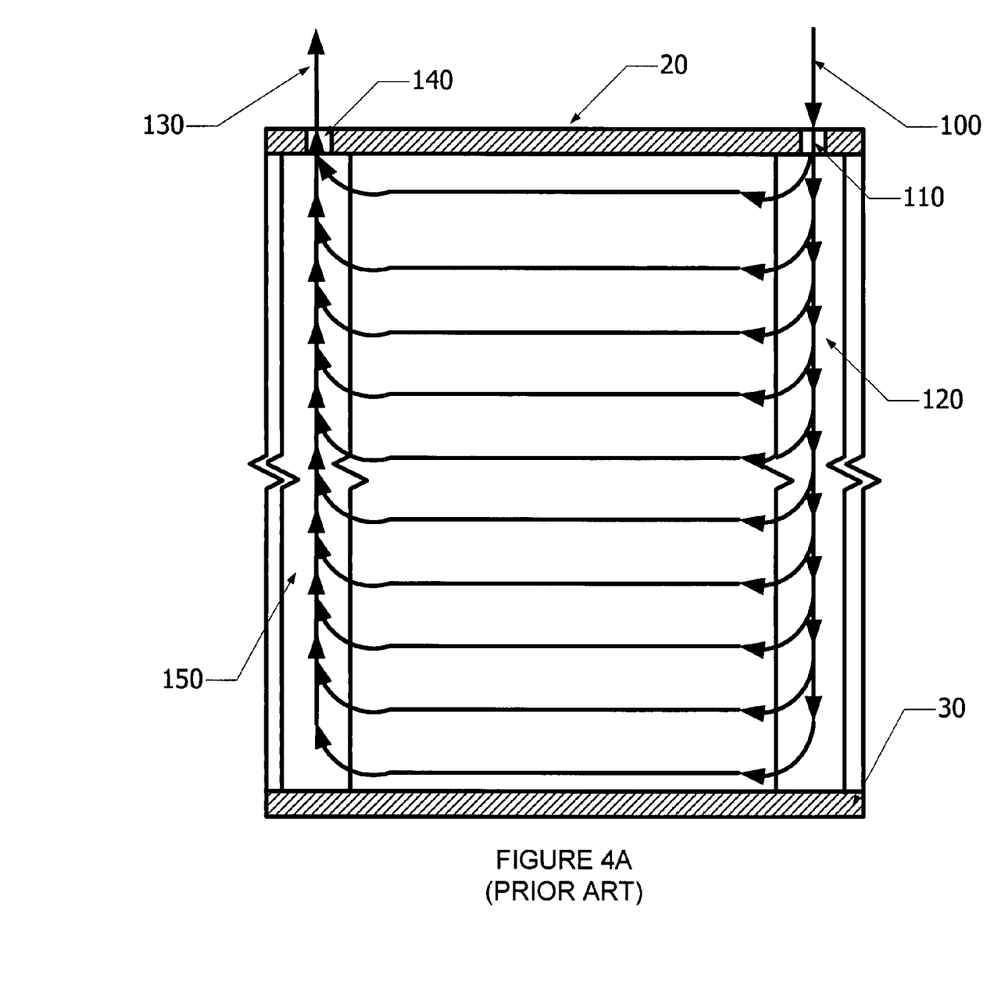
FIG. 4A is a top view of a prior art fuel cell stack showing the gas flow pattern.
Figure 4B:
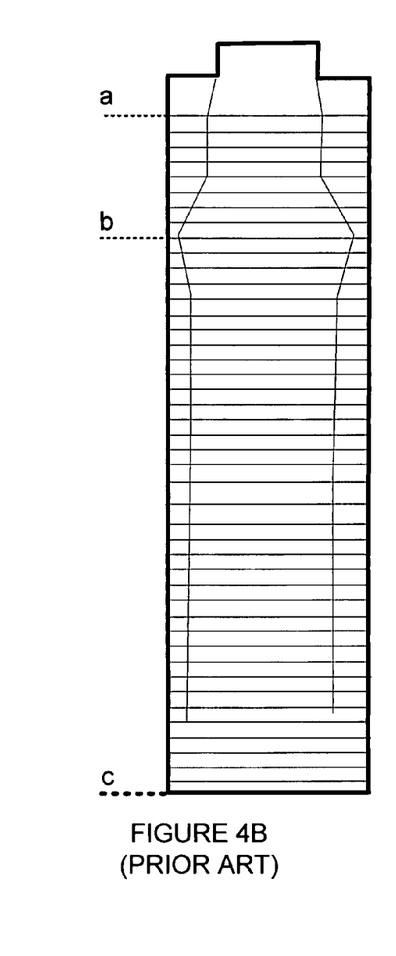
FIG. 4B is a graph of pressure distribution inside a prior art manifold.
Figure 4C:
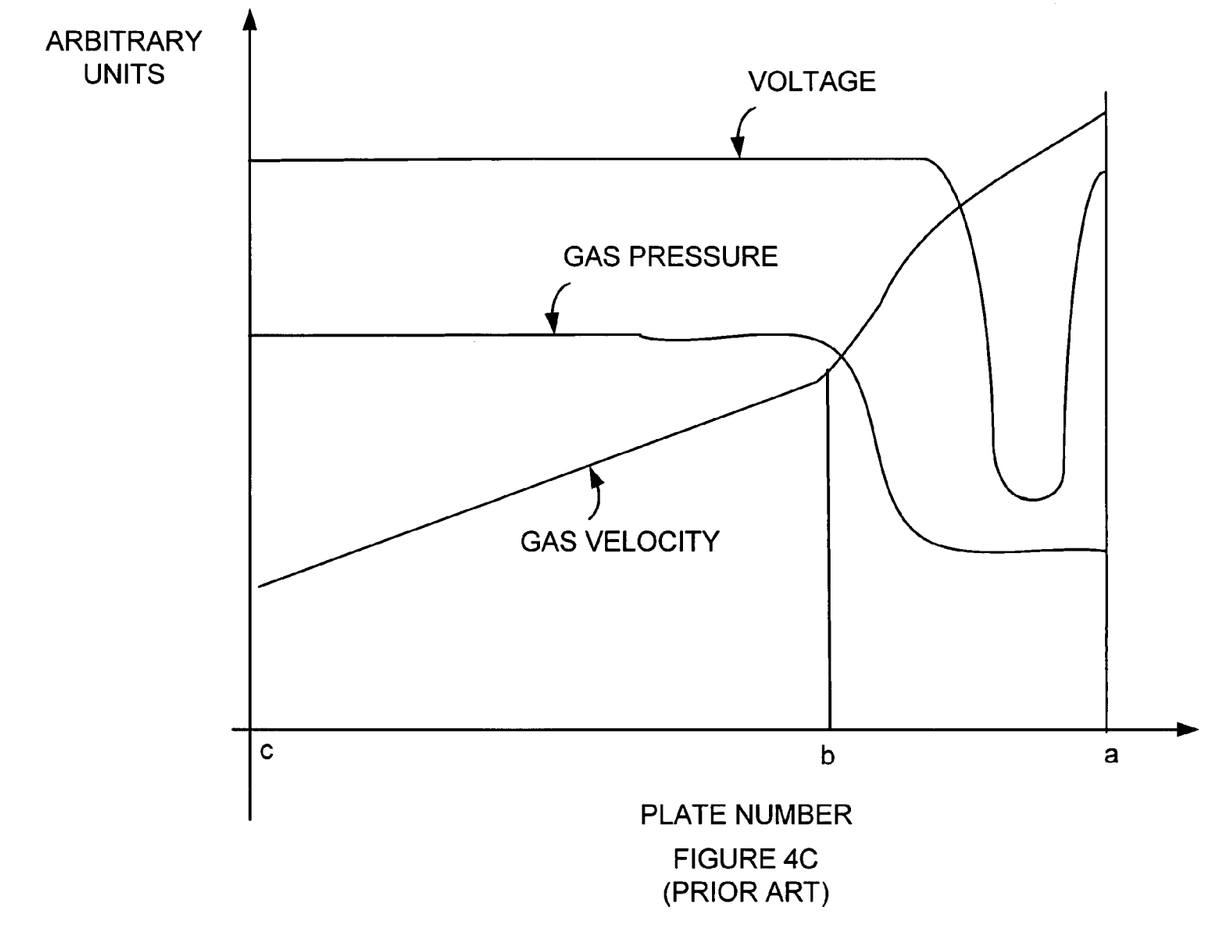
FIG. 4C is a graph of voltage, pressure distribution and velocity within a fuel cell stack designed according to prior art methods.

FIG. 4a shows the flow pattern in the stack, and FIG. 4b shows an example of pressure distribution inside the manifold. As the gas enters the manifold from the entrance 110, generally there is a change in flow pattern due to the change in the geometric structure between 110 and 120. Referring to FIG. 4b, there is a low-pressure zone near the entrance, and a wake (vortex) zone in the vicinity of the corners of the manifold entrance. As a result, the flow rate to the cells in the entrance region appears to be much smaller than that to the downstream cells. Toward the downstream inside the manifold, the mass flow rate gradually decreases because of flow into the cells, and consequently the pressure is gradually being recovered. The two main factors affecting the pressure change, and therefore the flow distribution in the manifold, are the change in gas mass flow rate and the change in geometry between the entrance 110 and the conduit formed by holes 120.

The aforementioned problems are more significant when the fuel cell stack is operated with reformate from a fuel processor. The problems disappear on some occasions, including when the stack is operated at the so-called dead-ended manner, and when the stack is operated at elevated pressures, in both cases, a high back or supply pressure is built to force the flow into the cells and reduce the non-uniform distribution. When the fuel cell stack is operated with reformate, in which an open-end has to be employed and the supply pressure is relatively low, the uneven distribution of gas in the stack tends to be severe. As described previously, when the flow of gas distributed to the individual unit cells of a fuel cell stack becomes non-uniform or unequal, water produced by the cell reaction, for example, may be present as liquid as a result of condensation and the inability of being removed from the channels due to reduced gas flow rate. If this happens, residing condensed water creates a resistance to gas flow, which in turn impedes the smooth flow of gas. If the gas supply conditions deteriorate in this manner in a fuel cell stack, the output voltage will vary among the unit cells and therefore the stack performance and lifetime will be adversely affected.

SUMMARY OF THE INVENTION

It is therefore the primary objective of the present invention to provide a gas manifold design that provides uniform flow to each cell in the stack. It is important that the manifold design according to the present invention should work equally well for the pure hydrogen (dead-ended operation) and reformate (continuous operation) at either low or high pressures.

According to a first broad aspect of the present invention, there is provided a method of controlling fluid flow to a stack of fuel cell flow field plates, the method comprising providing in each fuel cell flow field plate of the stack of plates a fluid supply manifold aperture for conducting a supply of fluid to a number of the plates in the stack, the fluid supply manifold apertures forming an elongated fluid supply manifold extending through the stack; flowing the supply of fluid into the fluid supply manifold; laterally diverting a part of the supply of fluid to feed each of the number of the plates, wherein the number of the plates are each fed in parallel from the fluid supply manifold, and the laterally diverting is performed in a manner to avoid turbulence in the fluid supply manifold from adversely affecting supply of fluid to downstream ones of the number of plates.

According to a second broad aspect of the present invention, there is provided a stack of fuel cell flow field plates comprising: a fluid supply manifold aperture provided in each fuel cell flow field plate of said stack of plates for conducting a supply of fluid to a number of said plates in said stack, said fluid supply manifold apertures forming an elongated fluid supply manifold extending through said stack; an fluid distribution manifold in each of said number of said plates, said fluid distribution manifold communicating said fluid to a plurality of inlet grooves in each of said number of said plates; a transition channel communicating between said fluid supply manifold and said fluid distribution manifold; wherein said number of said plates are each fed in parallel from said fluid supply manifold by laterally diverting a part of said supply of fluid to feed each of said number of said plates, and said laterally diverting is performed in a manner to avoid turbulence in said fluid supply manifold from adversely affecting supply of fluid to downstream ones of said number of plates.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Preferred embodiments of the present invention will be described in detail hereinafter with reference to the accompanying drawings FIG. 5 to FIG. 9.

Figure 5:
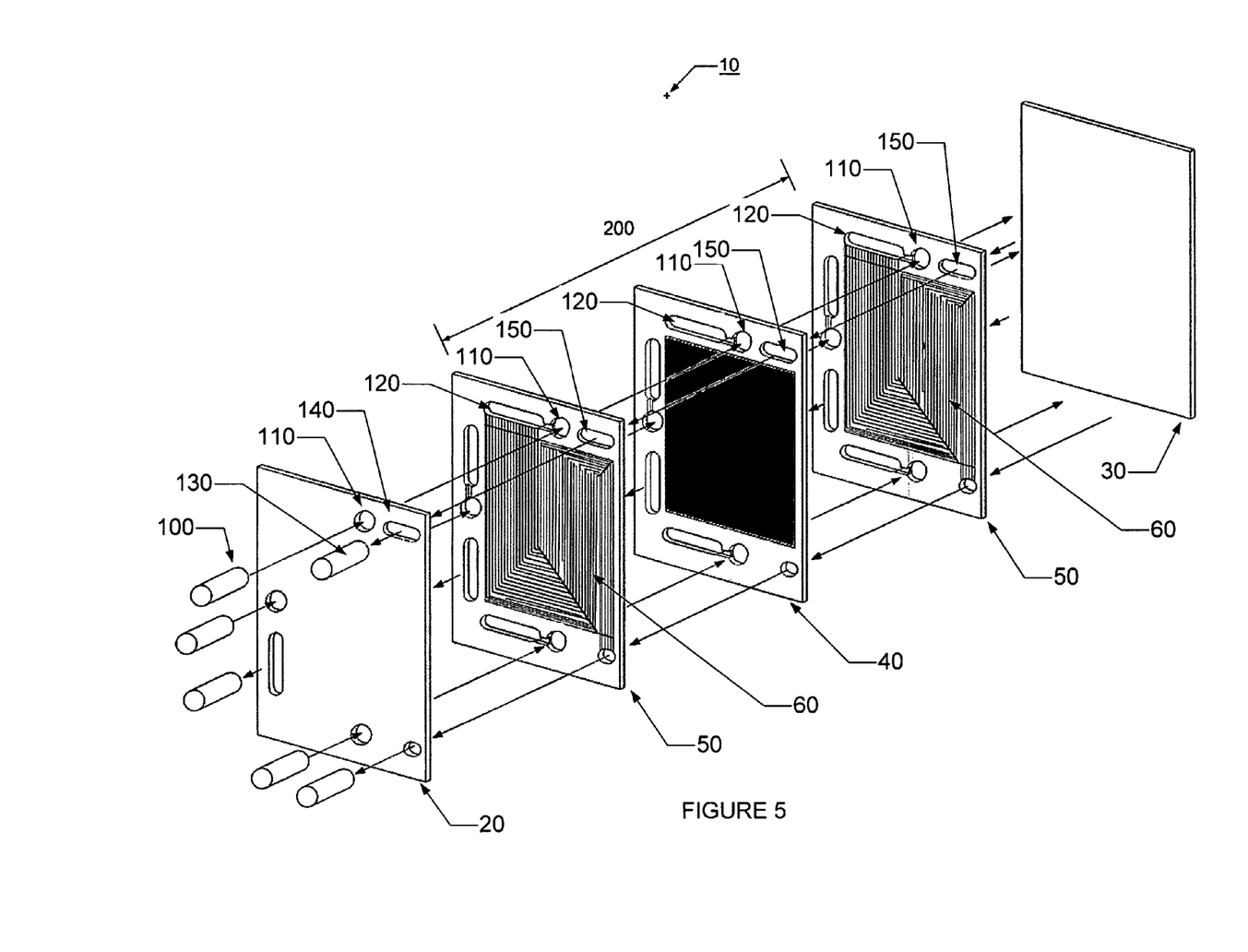
FIG. 5 is a perspective view, exploded, of a fuel cell stack according to the preferred embodiment of the present invention.

Referring to FIG. 5, a fuel cell stack 10 is structured according to the present invention by stacking a plurality of unit cells 200 repeatedly between an end plate 20 and another end plate 30. As shown in FIG. 5, an assembly comprising of a membrane electrode assembly (MEA) and integrated GDL and gasket 40 is sandwiched between an anode plate and a cathode plate. On each plate there is a first manifold hole 110, which preferably has the same shape and size as the hole 110 on the end plate 20. The first manifold hole 110 receives and transports the gas supply from the external gas supplying line 100. By having the geometry of the manifold holes 110 on the plates match the holes 110 on the end plate 20, the change in gas flow pattern due to geometric variation between supplying line and manifold entrance will be eliminated or at least minimized. The first manifold hole 110 does not directly connect to the gas passages 60, instead the gas is transferred from the hole 110 to a secondary manifold hole 120, which then distributes the gas into the gas passages 60. The second manifold 120 also serves as a buffer and gas redistribution means that improves the gas distribution uniformity to each individual unit cell in the stack. The details of the manifold structure are provided in FIG. 6.

Figure 6:
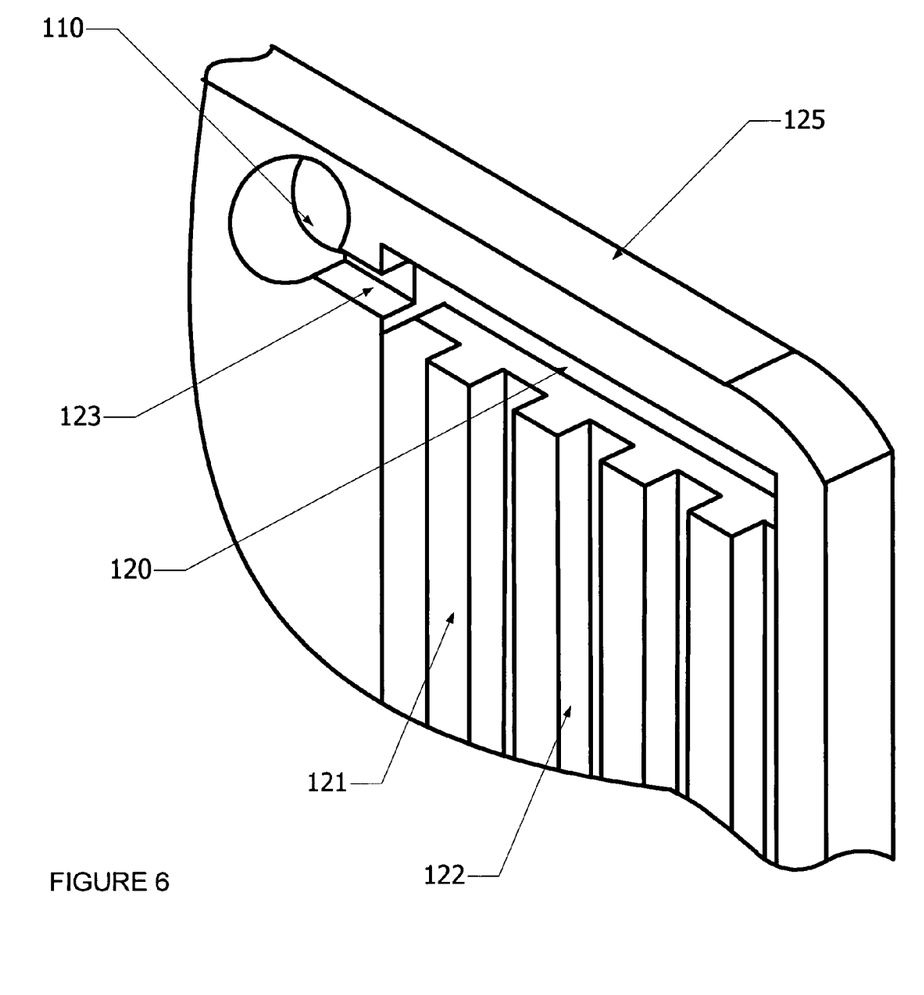
FIG. 6 is an enlarged view of a manifold structure according to the preferred embodiment of the present invention.
Figure 7:
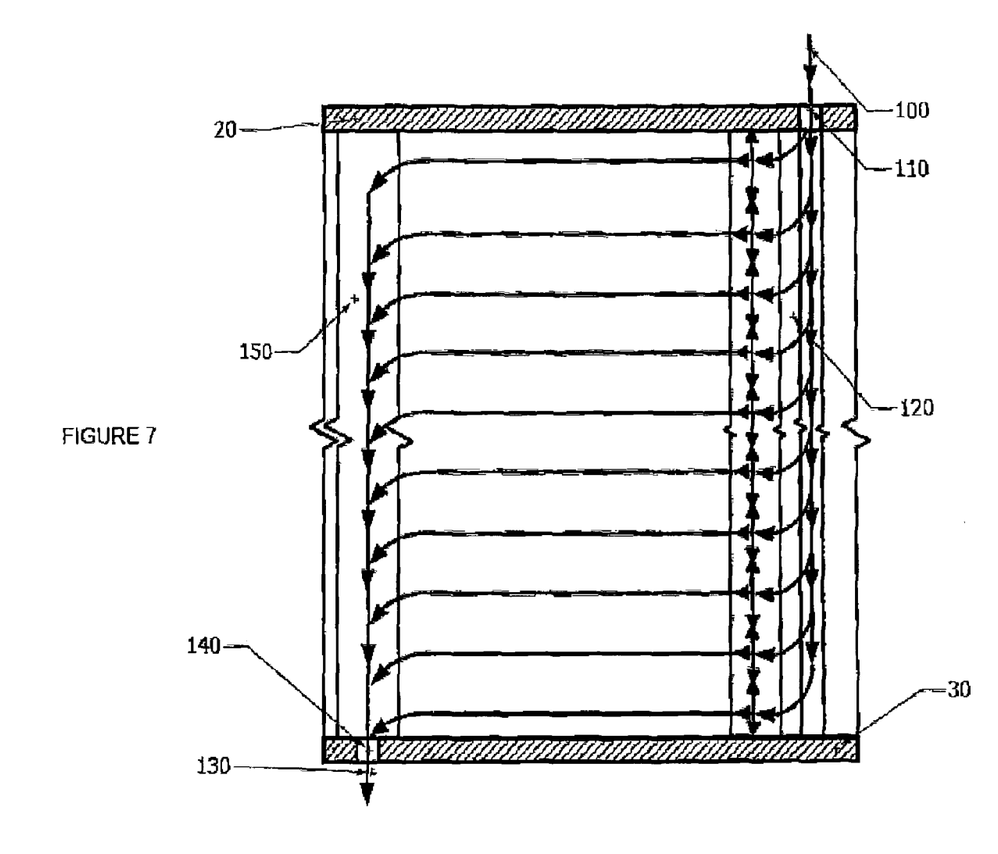
FIG. 7 is a top view of fuel cell stack according to the preferred embodiment of the present invention showing the gas flow pattern.

As schematically shown in FIG. 6, the gas flowing through the first manifold 110 will be flowing into the second manifold 120 through a transition channel 123. The gas entering the manifold 120 will be likely flowing in three possible directions, namely, into the flow passages 122, going forward and backward along the manifold 120. Such a flow pattern has been well illustrated in FIG. 7, which only shows a reverse flow arrangement for illustration purposes. As mentioned earlier, the flow can also be arranged in other configurations including parallel flow.

Figure 8:
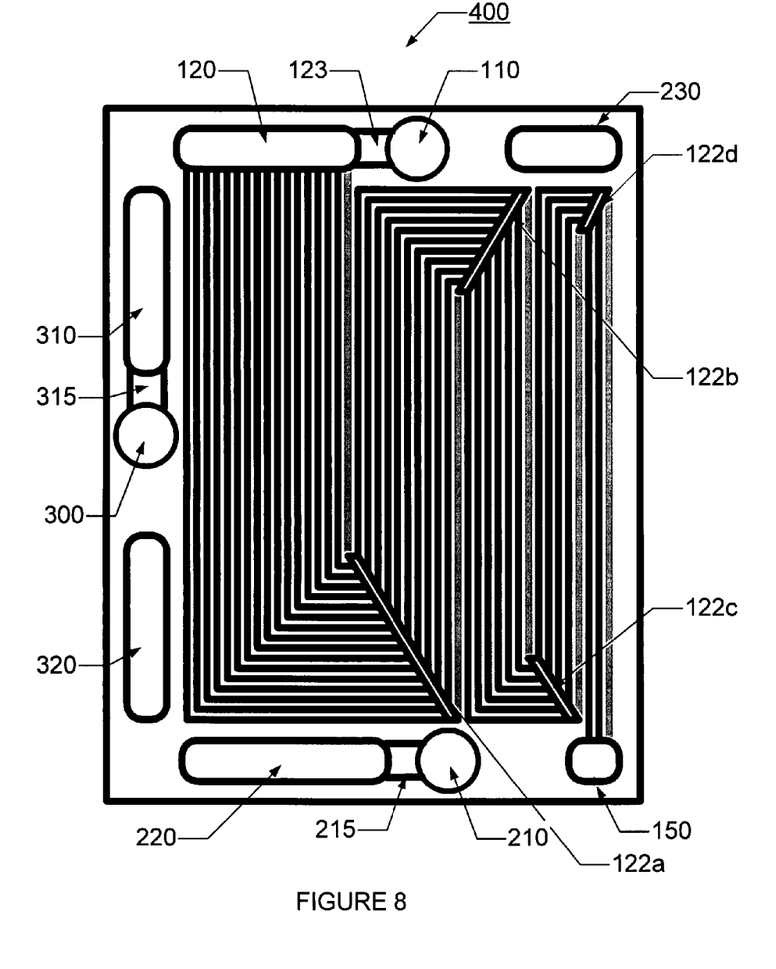
FIG. 8 is a plan view of a fuel cell according to the preferred embodiment of the present invention.

Shown in FIG. 8 is the preferred embodiment of a flow field plate having preferred gas manifolds according to the present invention and a flow field featuring high utilization of catalysts as described in the commonly assigned co-pending U.S. patent application titled "Flow Field Plate for Use in Fuel Cells". The fuel cell plate 400 could be either an anode plate for distributing fuel or a cathode plate for distributing oxygen-containing oxidant (air), or a plate for distributing coolant. For this particular plate example, it has been provided for an anode plate corresponding to a hydrogen utilization of 80% with an initial inlet concentration of 70%. The flow field has been designed to provide a "constant reactant molecules per active area" in order to maximize the catalyst utilization efficiency. The fuel first enters the first manifold formed by the holes 110, and then is directed through the transition channel 123 to the secondary manifold formed by the holes 120. A plurality of flow channels or grooves is connected to the second manifold 120 and extends to the first passage of the flow channels. In a serpentine fashion, the first passage of the flow channels reaches a joint mechanism 122a through which the gas is redistributed into a second flow passage having a smaller number of flow channels than the first passage. The gas advances this way through the flow field plate until it reaches the discharging manifold 150. The number of passages and the rate at which the flow channels are reduced from one passage to the next are determined by cell performance requirements such as fuel utilization and pressure drop.

The plate also comprises a first manifold 210 and a second manifold 220, communicating through a transition channel 215, for distributing the oxidant, and an oxidant discharging manifold 230. There are also provided a first manifold 300 and second manifold 310, connected by a transition channel 315, for distributing a suitable coolant. The coolant flow is discharged from the cells through an exhausting manifold 320. It should be understood that the positions of these first and second manifolds as shown in FIG. 8 are exemplary only, and they could be positioned in any preferred manner according to the present invention.

Figure 9:
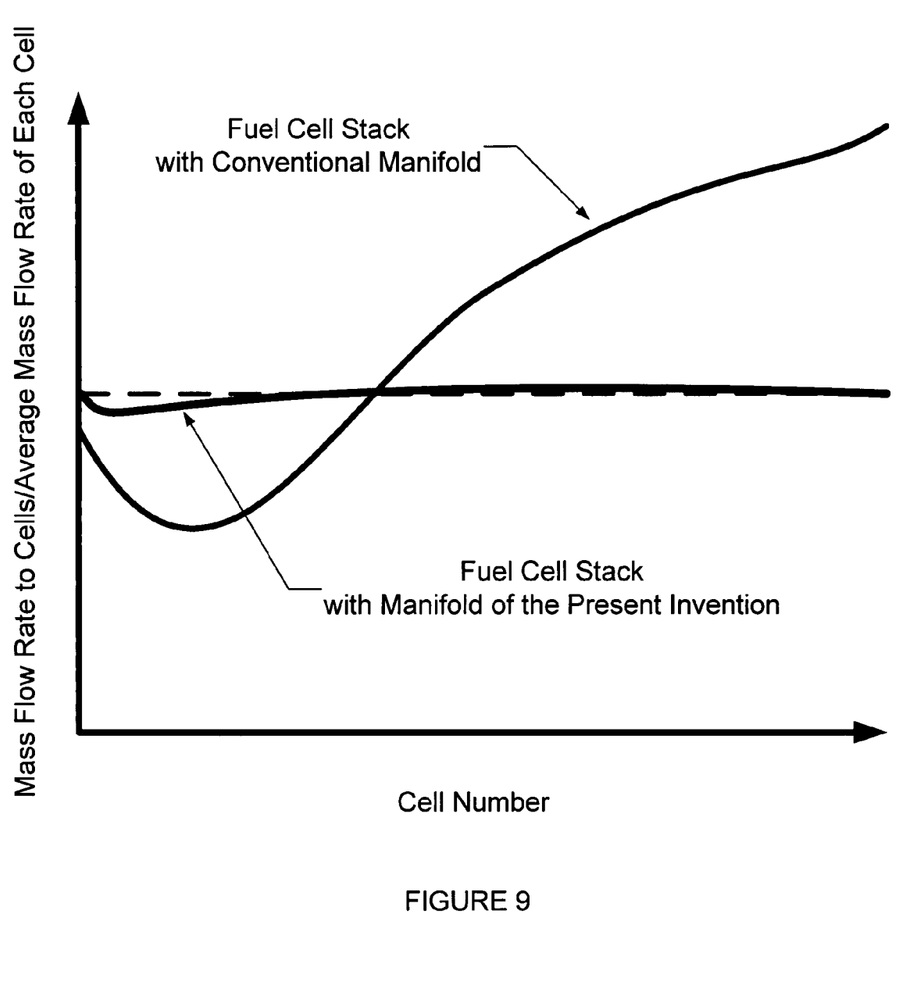
FIG. 9 is a graph showing gas distribution performance with the prior art manifold design and the manifold design according to the preferred embodiment of the present invention.

FIG. 9 compares the gas distribution performance between fuel cell stacks employing prior art manifolds and those using manifolds according to the present invention. It is understood that in both cases the flow field will have the same structure. It is clearly shown that the gas distribution according to the present invention is considerably uniform, with a maximum deviation of ±5% from the average (a perfect uniform distribution has a 0% deviation). The prior art designs, however, will have much less gas going into some cells located at one end and more gas into cells at the other end. The deviation can be up to ±30-50% or even more.

While in the preferred embodiment control of the fluid flow to the stack of fuel cells is achieved with a distribution manifold, providing a low resistance, connected to an inlet header manifold by way of a transition channel, even distribution of fluid flow to each fuel cell plate and reduced gas velocity at the entrance of the stack could be achieved by other means, such as providing baffle structures in the manifold which would decrease turbulence in the fluid flow and ensure even distribution to each plate. (NB: This is provided as an alternative to the preferred embodiment in order to support a claim as broad as claim 1.)

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A method of controlling fluid flow to a stack of fuel cell flow field plates, the method comprising steps of:
    providing in each fuel cell flow field plate of said stack of plates a fluid supply aperture for conducting a supply of fluid to a number of said plates in said stack, said fluid supply aperture forming an elongated supply manifold extending through said stack;
    flowing said supply of fluid into said elongated supply manifold;
    laterally diverting a part of said supply of fluid to an elongated distribution manifold to feed each of said number of said plates, said elongated distribution manifold forming a fluid conduit extending through said stack and communicating said fluid to a plurality of inlet grooves, wherein said number of said plates are each fed in parallel from said elongated supply manifold, and said laterally diverting is performed in a manner to avoid turbulence in said elongated supply manifold from adversely affecting supply of fluid to downstream ones of said number of plates.

2. The method as claimed in claim 1, wherein said laterally diverting comprises providing a transition channel communicating between said fluid supply aperture and said elongated distribution manifold in each of said number of said plates.

3. The method as claimed in claim 2, wherein flow through said transition channel is directed into said elongated distribution manifold transversely to a direction of said transition channel.

4. The method as claimed in claim 3, wherein said elongated supply manifold is circular in cross-section, and flow in said elongated supply manifold is essentially non-turbulent.

5. The method as claimed in claim 3, wherein an external supply manifold supplying said fluid has a cross-section matching said elongated supply manifold such that flow distribution is uniform.

6. The method as claimed in claim 4, wherein said transition channel has a cross-section of radius less than or equal to a radius of said elongated supply manifold.

7. A stack of fuel cell flow field plates comprising:
    a fluid supply manifold aperture provided in each fuel cell flow field plate of said stack of plates for conducting a supply of fluid to a number of said plates in said stack, said fluid supply manifold apertures forming an elongated fluid supply manifold extending through said stack;
    a fluid distribution manifold in each of said number of said plates, said fluid distribution manifold forming a fluid conduit extending through said stack and communicating said fluid to a plurality of inlet grooves in each of said number of said plates;
    a transition channel communicating between said fluid supply manifold and said fluid distribution manifold;
    wherein said number of said plates are each fed in parallel from said fluid supply manifold by laterally diverting a part of said supply of fluid to feed each of said number of said plates, and said laterally diverting is performed in a manner to avoid turbulence in said fluid supply manifold from adversely affecting supply of fluid to downstream ones of said number of plates.

8. The stack as claimed in claim 7, wherein said transition channel is oriented to direct flow into said fluid distribution manifold transversely to a direction of said transition channel.

9. The slack as claimed in claim 8, wherein said fluid supply manifold is circular in cross-section.

10. The stack as claimed in claim 9, wherein said transition channel has a cross-section of radius less than or equal to a radius of said fluid supply manifold.

\* \* \* \* \*